United States Patent [19]
Kwon et al.

[11] Patent Number: 5,751,436
[45] Date of Patent: May 12, 1998

[54] METHOD AND APPARATUS FOR CYLINDRICAL COORDINATE LASER ENGRAVING

[75] Inventors: Young Key Kwon, Longmont, Colo.; Ashot Mesropian, Yerevan, Armenia; Kwang Min Lee, Broomfield; Sergey Soboley, Aurora, both of Colo.

[73] Assignee: Rocky Mountain Instrument Company, Longmont, Colo.

[21] Appl. No.: 772,382

[22] Filed: Dec. 23, 1996

[51] Int. Cl.$^6$ ......................................... B41C 1/04
[52] U.S. Cl. ............................................... 358/299
[58] Field of Search ..................................... 358/299

[56] References Cited

U.S. PATENT DOCUMENTS

| | | | |
|---|---|---|---|
| 3,716,668 | 2/1973 | Barron | 178/6.6 B |
| 3,786,332 | 1/1974 | Hepner et al. | 409/80 |
| 4,878,127 | 10/1989 | Zollman et al. | 358/299 |
| 4,950,862 | 8/1990 | Kajikawa | 219/121.7 |
| 4,970,600 | 11/1990 | Garnier et al. | 358/299 |
| 4,985,780 | 1/1991 | Garnier et al. | 358/299 |
| 4,988,873 | 1/1991 | Lubinsky et al. | 250/327.2 |
| 5,041,716 | 8/1991 | Wakabayashi | 219/121.68 |
| 5,059,764 | 10/1991 | Baer | 219/121.68 |
| 5,109,149 | 4/1992 | Leung | 219/121.69 |
| 5,120,927 | 6/1992 | Williams et al. | 219/121.68 |
| 5,215,864 | 6/1993 | Laakman | 430/293 |
| 5,225,650 | 7/1993 | Babel et al. | 219/121.69 |
| 5,262,613 | 11/1993 | Norris et al. | 219/121.68 |
| 5,298,717 | 3/1994 | DeRosseff, Jr. | 219/121.68 |
| 5,313,043 | 5/1994 | Yamagishi | 219/121.68 |
| 5,329,381 | 7/1994 | Payne | 358/455 |
| 5,396,045 | 3/1995 | Opdyke | 219/121.69 |
| 5,401,979 | 3/1995 | Kooijman | 250/561 |
| 5,416,298 | 5/1995 | Roberts | 219/121.68 |
| 5,418,088 | 5/1995 | Alexandres | 429/175 |
| 5,424,845 | 6/1995 | Holowko et al. | 358/299 |
| 5,424,846 | 6/1995 | Bornorst et al. | 358/299 |
| 5,468,930 | 11/1995 | Nishikawa | 219/121.6 |
| 5,477,023 | 12/1995 | Schneider et al. | 219/121.68 |
| 5,555,473 | 9/1996 | Seitz | 358/299 |
| 5,605,097 | 2/1997 | Ruckl et al. | 219/121.69 |

*Primary Examiner*—Eric Frahm
*Attorney, Agent, or Firm*—Rick Martin

[57] ABSTRACT

A method and apparatus including a system for cylindrical or polar coordinate movement of a material or laser beam whereby the material is engraved with an image upon a rotary table. The rotary table is connected to a translation stage. The movement of the translation stage is coordinated with the rotation of the rotary table and the firing of the laser to effectively allow engraving of a material in a series of concentric circles. The system allows high-speed and high-resolution laser engraving. The system is also simpler and cheaper than conventional X-Y methods and apparatus. The method and apparatus are useful for photographic quality laser engraving.

38 Claims, 13 Drawing Sheets

FIG. 13 APPENDIX 1

The Language is Visual Basic 4.0 for Windows

This Source Code Corresponds to FIG. 7, Item 55.

METHOD AND APPARATUS FOR CYLINDRICAL COORDINATE LASER ENGRAVING

FIELD OF INVENTION

The present invention relates to laser engravers capable of cylindrically moving the laser beam or the material to be engraved or both in order to achieve high-speed high-quality engraving.

BACKGROUND OF THE INVENTION

The present invention relates to a new method and laser engraving apparatus which can move and control the material to be engraved or laser beam using a cylindrical coordinate system or polar coordinate system while simultaneously rotating and radially translating the material to be engraved.

There are various known laser engraving methods and apparatus which are basically based on an X-Y coordinate system.

One known type of such method and apparatus is the X-Y table type in which the laser beam is fixed. The workpiece material on the X-Y table moves using the X-Y coordinate system. The laser can be turned on and off to engrave when the material position is moved. Position control can be accomplished using a computer or a similar position control device to achieve the required pattern of engraving. In this case, the maximum speed of engraving is restricted to the speed of travel of the table. Only a relatively low table speed can be achieved with the current known X-Y laser engravers. We may, however, expect high quality because high positioning accuracy may be obtained.

Another known type of method and apparatus is the moving mirror type in which the laser beam moves and the workpiece on the table is fixed. Galvanometers or other similar devices can be employed to effect the mirror movement. Position control is accomplished using the X-Y coordinate system. In this case, the maximum speed of engraving is restricted to the speed of the oscillating device (i.e., galvanometer). Relatively high speed can be achieved. However, the positioning accuracy in this configuration is relatively crude. This configuration is good for so-called vector marking in which characters and symbols are main candidates for engraving.

A known method for carving objects by laser utilizes a laser beam on close guide paths allowing movement in an axis Z. The workpiece is mounted on a table having close guide paths allowing movement in an axis X normal to said axis Z. The table then rotates allowing the workpiece to be carved through a combination of rotation and movement of the table in the X axis. Speed of rotation of the table is not a factor in this prior art.

Other configurations may be obtained using the combination of the above mentioned systems. Those mixed configurations are basically the same in the sense that they employ an X-Y coordinate system for the movement of material and/or laser beam to accomplish the engraving process.

However, in the above described conventional methods, all movement, either material or laser beam, is based on the X-Y coordinate system. Therefore, the speed and engraving quality would be compromised according to the budget for implementing the systems.

The above mentioned methods are not practical for photographic quality engraving, because obtaining high speed and resolution at the same time as the reasonable cost is not currently available nor do the systems engrave the image while the material is rotating in a plane normal to the laser beam.

In a typical Nd (Neodymiun):YAG laser engraving machine with an X-Y table, the maximum table speed is 0.1 m/sec. In order to operate properly, the table must first accelerate to its proper translational speed, translate at the proper speed for a fixed time or distance, and then decelerate at the end of a line in anticipation of reversing direction for the next line. Assuming the acceleration/deceleration time to be 20 percent of the total per line time, this gives some indication of the time expended by changing directions. Given a laser spot diameter $\phi$ of $10\mu$ and assuming 1000 points per cm, the time per line is:

$$T1=0.012 \text{ sec.}$$

Assuming an image size of 1 cm×1 cm, this gives a minimum image engraving time of:

$$T=T1*1000 \text{ points}=12.0 \text{ sec.}$$

The typical cost of such a system including the translational stage and controller is $10k to $20k.

In another machine representative of the art, a typical Nd:YAG laser engraving machine with galvanometer has a beam scan speed of 1. m/sec. This gives a minimum time per line of:

$$T1=0.01 \text{ sec.}$$

This gives a minimum image engraving time of:

$$T=T1*1000 \text{ points}=10 \text{ sec.}$$

The cost for such a system is typically $20k to $50k. The system is complex as well as expensive.

The present invention solves the above described engraving time and engraving quality disadvantages accompanying the conventional methods and apparatus of engraver movements. It provides a new laser engraving system which uses cylindrical or polar coordinate system to achieve high speed and resolution to engrave rotating material while moving the material and/or laser beam according to a cylindrical or polar coordinate system. Any form of laser capable of engraving or etching the material of interest is suitable in this invention.

Also representative of the art is:

U.S. Pat. No. 5,555,473 (1996) to Seitz depicts a cylindrical engraving system selectively able to engrave either in a helical or circumferential format. Engraving is performed by an engraving head.

U.S. Pat. No. 5,468,930 (1995) to Nishikawa discloses a laser sputtering apparatus which includes a laser oscillator for emitting laser beams, a target-support, a device for rotating the target and an optical device for irradiating the target.

U.S. Pat. No. 5,477,023 (1995) to Schneider et al. discloses a system and a method for engraving an image on a workpiece utilizing an X-Y positioning mechanism and laser assembly.

U.S. Pat. No. 5,424,846 (1995) to Bornhorst et al. discloses a method and apparatus for automated loading and unloading of a cylinder in an engraver.

U.S. Pat. No. 5,424,845 (1995) to Holowko et al. discloses an apparatus for engraving a gravure printing cylinder including a setup circuit enabling direct dimensional control of the cavities engraved by a stylus.

U.S. Pat. No. 5,418,088 (1995) to Alexandres discloses a laser inscribing system for on-step labeling, dating, or applying appropriate artwork to a plastic battery enclosure case.

U.S. Pat. No. 5,416,298 (1995) to Roberts discloses an apparatus for preparing a medium for use in a printing process wherein the medium rotates about an axis. A laser beam engraves a series of cell sites as the medium rotates.

U.S. Pat. No. 5,401,979 (1995) to Kooijman discloses methods, devices, and an image sensor for investigating an object by means of a reflectable radiation beam detected by an optical detector and a multidimensional image sensor.

U.S. Pat. No. 5,396,045 (1995) to Opdyke discloses a target surface photoablated by a laser beam and a rotating target.

U.S. Pat. No. 5,329,381 (1994) to Payne discloses an automatic engraving system which scans an image such as a photograph and samples and resizes the image to provide a masterized gray scale data base of the image.

U.S. Pat. No. 5,313,043 (1994) to Yamagishi discloses equipment for excimer laser ablation machining with a laser focused on an object to be machined.

U.S. Pat. No. 5,298,717 (1994) to DeRossett discloses a method and apparatus for scribing indicia into a surface using a laser as an emission source.

U.S. Pat. No. 5,262,613 (1993) to Norris discloses a laser assembly adapted to retrofit industrial mechanical engravers to convert the mechanical engraver to a laser engraver.

U.S. Pat. No. 5,225,650 (1993) to Babel et al. discloses a process and a device for the manufacture of relatively deep cavities in massive workpieces through a laser beam whereby the material is rotated and moved axially while the laser beam is moved axially in a close guide path.

U.S. Pat. No. 5,215,864 (1993) to Laakman discloses a method and apparatus for engraving a metal plate in two or more colors.

U.S. Pat. No. 5,120,927 (1992) to Williams et al. discloses a magnetic information storage medium, such as a floppy or rigid magnetic disk, and an apparatus and method for inscribing a plurality of indelible grooves in a surface of the medium to function as optical servo tracks.

U.S. Pat. No. 5,109,149 (1992) to Leung discloses a laser, direct-write system for making personalized custom or semi-custom integrated circuits with a very fast turnaround time.

U.S. Pat. No. 5,059,764 (1991) to Baer discloses a diode laser pumped, solid state laser-based system and related method of operation for precision material processing and machining.

U.S. Pat. No. 5,041,716 (1991) to Wakabayashi discloses a laser machining device comprising a converter for converting clock pulses, thereby giving beam off and on dots controlled through an acousto-optic modular unit to direct the laser beam to the object.

U.S. Pat. No. 4,988,873 (1991) to Lubinsky et al. discloses an apparatus for scan-simulating a transparent image-storage phosphor to recover a latent image previously formed therein, by an imagewise exposure to X-radiation.

U.S. Pat. No. 4,985,780 (1991) to Garnier et al. discloses an X-Y coordinate system including a laser device and a beam delivery system comprising a number of mirrors and an X-Y carriage assembly.

U.S. Pat. No. 4,970,600 (1990) to Garnier et al. discloses a laser engraver for engraving using a X-Y assembly to move the laser beam in two dimensions relative to the workpiece.

U.S. Pat. No. 4,950,862 (1990) to Kajikawa discloses a laser beam machining apparatus for finely machining a semiconductor circuit on a stage having driving means for X-Y movement.

U.S. Pat. No. 4,878,127 (1989) to Zollman et al. discloses a laser engraving machine for engraving rotary printing screens.

U.S. Pat. No. 3,716,668 (1973) to Barron discloses an engraving machine having a means for rotating a cylinder and a scanning member and a cutting member cooperating on the image and plate to be engraved each of which rotate on said cylinder.

SUMMARY OF THE INVENTION

The method and apparatus of the present invention is aimed at providing a system control and a workpiece and/or laser beam positioning module which rotates at high speed. The workpiece rotates in a plane normal to the laser beam while moving the laser beam according to cylindrical coordinates. The present invention also provides a means for determining an automatic start position for the engraving process.

In the case where a small area of the workpiece is engraved, it is possible to use either a high-speed rotary table supported by a linear table or rotating optics assembly with a linear table depending on the shape of the workpiece to be engraved. Symmetrical or round-shaped material can be easily fixed on the rotary table. For odd-shaped asymetrical workpieces, rotating optics assemblies to move the laser beam is preferred.

In either case, engraving data is processed by the system control which consists of an image scanner and software/hardware to transform the image data from an X-Y coordinate system to a cylindrical or polar coordinate system. The scanned image is converted pixel by pixel from the starting point at the 'center' of the image to the outermost extremity. The number of pixels per revolution is a function of the radius from the center. The system control sends this data to the motor driver and laser control. More laser pulses per revolution are required for the larger radii due to the increased angular velocity. Because of the nature of rotary motion, it is very easy to get high rotational speeds on the order of 6000 rpm. Resolution can be varied by changing the number of laser pulses per revolution and/or as a function of rotational speed. The maximum engraving speed is limited by the maximum number of pulses per second available from the laser. Engraved resolution of over 300 dpi is easily achieved.

This configuration is suitable for the markings imprinted format occluded below the workpiece surface. This only requires the focused laser beam to be positioned below the surface of the workpiece. Also, the marking speed of the prior art engraving methods, which rely on the X-Y coordinate system, can be written in [m/sec] or [in/sec] depending on the linear speed of the laser beam or workpiece. In the case of the instant invention, the engraving speed can be written in [square in/sec] or [square m/sec]. It is easy to achieve engraving speeds faster than 1 square inch/sec.

In the case of the cylindrical coordinate system, because engraving of the workpiece is accomplished in a circular motion, it is important to fix the laser beam and center of rotational movement of the workpiece before starting the engraving. A laser diode or similar device is used to project a cross-hair beam to the surface of the workpiece. The engraving start point can be repositioned either manually or automatically. For the automatic start position finding, a video camera processing system is used to measure and reposition the workpiece. A quadrant photo-detector is used to sense the laser beam position and to process the output of the quadrant photo-detector to send the repositioning data to the system control. The system control then causes the step motors to sequentially operate to properly align the workpiece within the laser beam.

Since the present invention operates with a rotating workpiece, the minimum time per line is greatly reduced over the prior art. Assuming a rotational speed of 6000 RPM, the minimum time per line is:

$$T1=0.01 \text{ sec.}$$

This gives a minimum image engraving time of:

$$T=T1*1000 \text{ points}*2^{1/2}/2=7 \text{ sec.}$$

This represents an improvement in engraving time of 41 percent over the prior art. The cost for the present invention is estimated at $5k to $6K which is significantly less than the cost of the aforementioned prior art X-Y engravers.

In summary, the main object of the present invention is to provide a laser engraver having a rotating workpiece and having a controller using polar coordinates to engrave an image on the rotating workpiece.

Another object of the present invention is to rotate the laser instead of the workpiece.

Another object of the present invention is to provide a video camera to sense the start position and position the workpiece.

Another object of the present invention is to coordinate a linear actuator which supports the rotating assembly with the controller to form the image.

Other objects and further scope of applicability of the present invention will become apparent from the following detailed description and appended claims, reference being made to the accompanying drawings forming a part of this specification wherein like reference characters designate corresponding parts in the several views.

It should be understood, however, that the detailed description and specific examples, while indicating preferred embodiments of the invention, are given by way of illustration only, since various changes and modificationswithin the spirit and scope of the invention will become apparent to those skilled in the art from this detailed description.

BRIEF DESCRIPTION OF THE DRAWINGS

FIG. 13 (Appendix 1) is the source code for the polar coordinate mapping in the controller.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
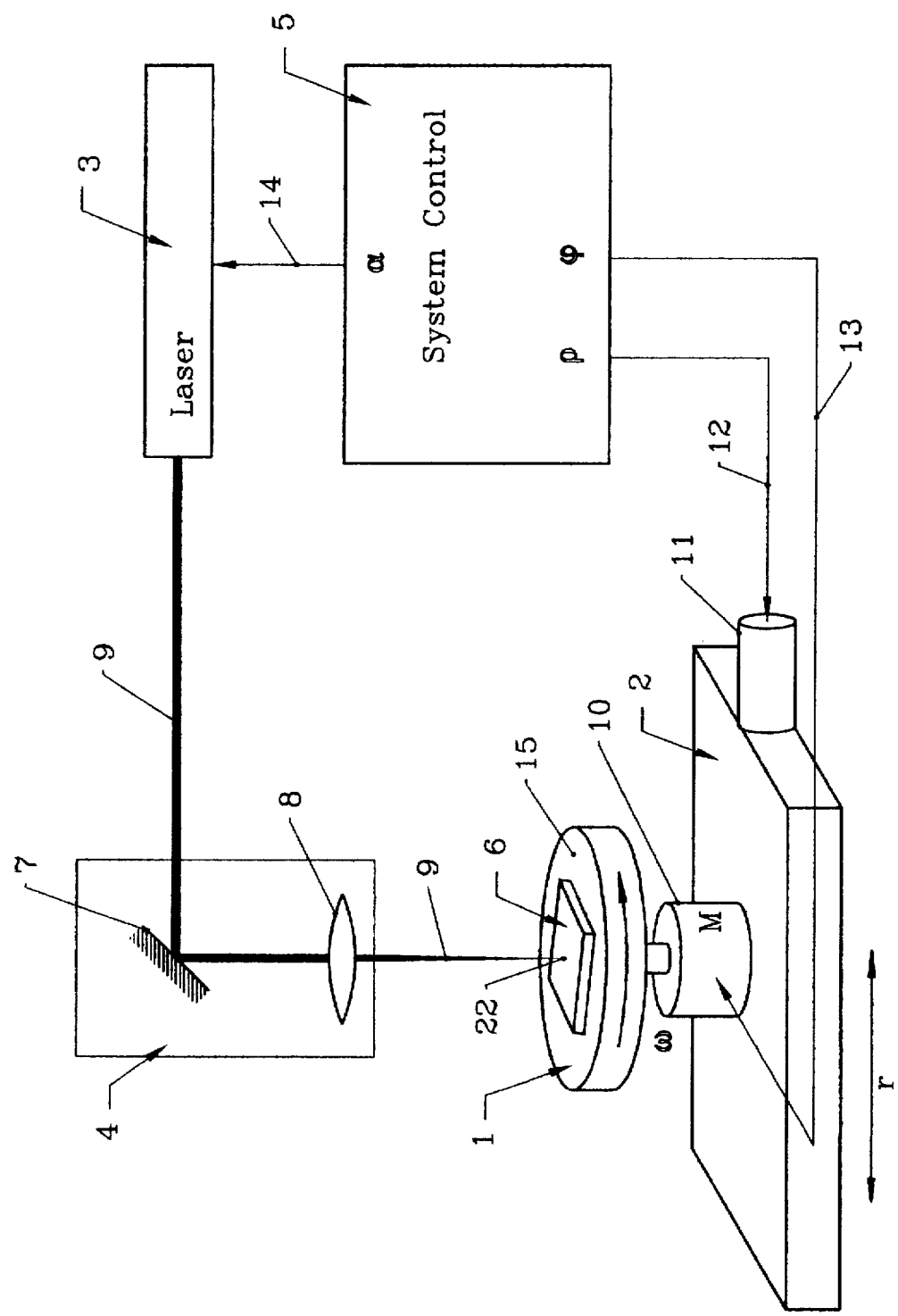
FIG. 1 is a schematic of the preferred embodiment.

Referring first to FIG. 1 a schematic depiction of the preferred embodiment is shown. The system comprises a rotary table 1 driven by step motor 10 and a linear stage 2 driven by step motor 11. The rotary table 1 and linear stage 2 are known in the art. The step motors are typically DC step motors known in the art. Step motors 10 and 11 are connected to the system control 5 by leads 13 and 12 respectively. Leads 13 and 12 transmit the control signals $\phi$ and $\rho$ respectively to step motor 10 and step motor 11 respectively. The motion of the rotary table 1 and linear stage 2 are controlled by these signals in conjunction with the firing of the laser beam source 3. Lead 14 transmits control signal $\alpha$ from system control 5 which controls the firing of the laser beam source 3.

The workpiece 6 to be engraved is mounted on the top 15 of rotary table 1. The material 6 is engraved by the laser beam 9 which emanates from the laser beam source 3. The laser beam 9 is focused by the focusing optics controller 4. Focusing optics controller 4 comprises a mirror 7 and lens 8 which focuses laser beam 9 on the workpiece 6 at the point of engraving 22.

In operation, the initial point of engraving 22 on the workpiece 6 is established by the user. System control 5 then transmits control signal $\phi$ to step motor 10 to rotate rotary table 1 at a predetermined speed or angular velocity $\omega$. The angular velocity $\omega$ may be up to or in excess of 6000 rpm. Laser beam source 3 is then commanded to fire by control signal $\alpha$ from system control 5 based upon the image to be engraved. Laser beam source 3 will be fired by the system control 5 as required by start time and duration of pulse to produce a single line (or circle) of the image to be engraved. Once a full rotation of the workpiece 6 has occurred, typically on the order of 0.01 sec., then step motor 11 is commanded by system control 5 with signal $\rho$ to operate. Step motor 11 is operated only for so long as is required to move, or step, the workpiece 6 to a distance radially equal to the width of the next line to be engraved. The typical time required to move radially one step is <0.1 m sec. Once accomplished, the step motor 11 is stopped. Step motor 10, which operates during operation of step motor 11 and movement of linear stage 2, then rotates the workpiece 6 through 360°. During the rotation, the system control transmits signal $\alpha$ which causes the laser beam source 3 to fire the requisite times necessary to engrave another line (or circle) of the image in the workpiece 6 immediately adjacent to the line engraved on the prior rotation, typically a space of 10 µm. The process repeats until the engraving is complete at which time system control 5 stops rotation of rotary table 1 and the firing of laser beam source 3.

Figure 2:
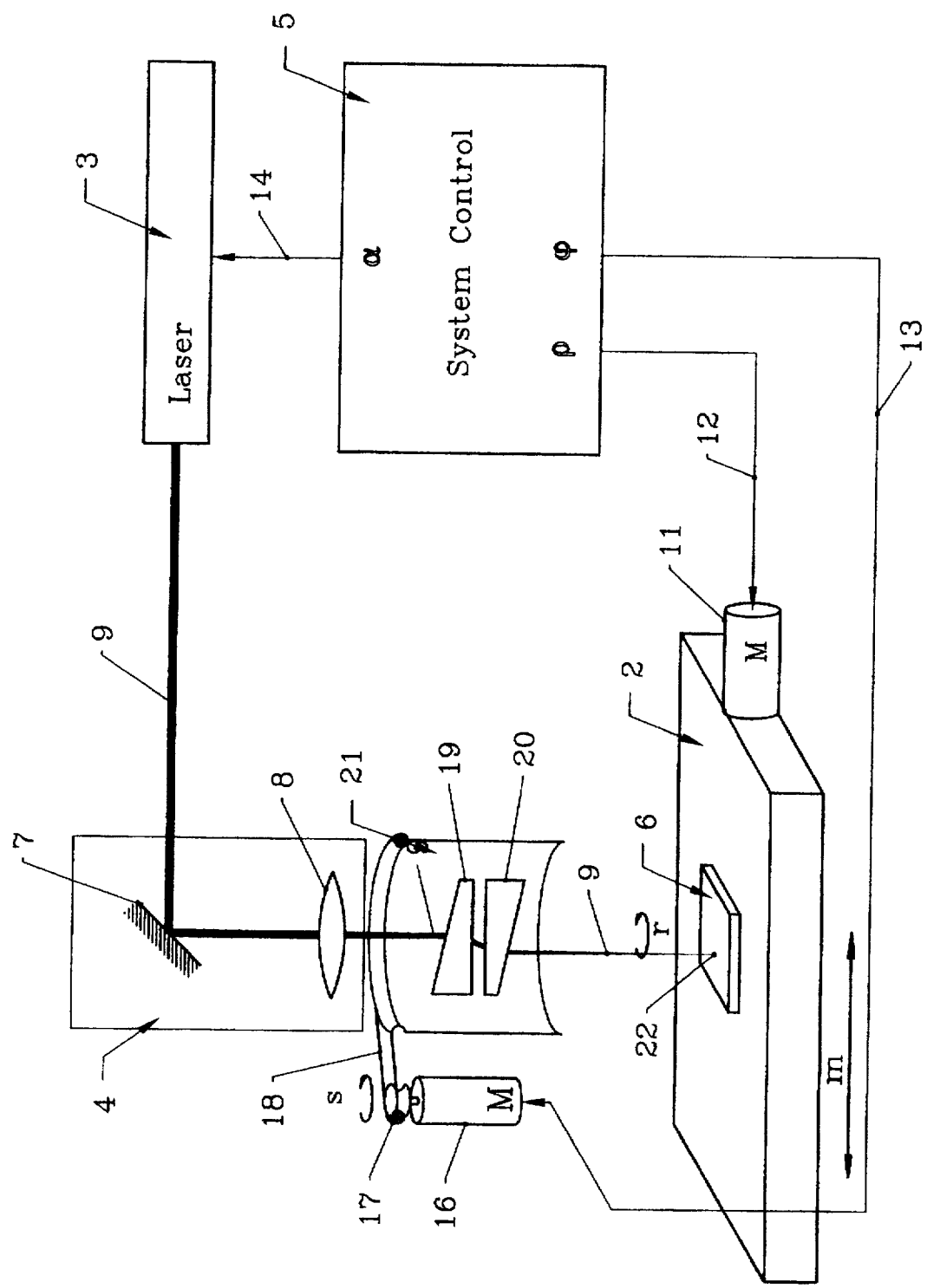
FIG. 2 is a schematic of an alternate embodiment depicting a laser beam rotator.

Referring next to FIG. 2 a schematic of an alternate embodiment depicting a laser beam rotation means is shown. In this embodiment, rotary table 1 (not shown) and step motor 10 (not shown) are replaced by lens housing 21 and step motor 16. Step motor 16 is controlled by control signal $\phi$ transmitted by lead 13 from system control 5. Lens 19 and lens 20 are contained within lens housing 21. Lens housing 21 is rotated by step motor 16 which acts through capstan 17 on belt 18. The rotation of lens housing 21 imparts rotation to lenses 19 and 20 which causes laser beam 9 to rotate through arc r. The angular velocity ω of lens housing 21 may be or exceed 6000 rpm. Engraving of material 6 is accomplished by the laser beam 9 which passes through the focusing optics controller 4 and lens 19 and lens 20. The point of engraving 22 on workpiece 6 is controlled by the focusing optics controller 4 and lens housing 21 acting upon laser beam 9. Rotation of lens housing 21 imparts a rotary motion to the laser beam 9 through arc r and in turn to the point of engraving 22. As the lens housing 21 rotates, laser beam source 3 is commanded by signal α to fire based upon the stored image of the image to be engraved. Laser beam source 3 is fired by system control 5 as required by start time and pulse duration to produce a single line (or circle) of the image. Once a full rotation of the lens housing 21 and point of engraving 22 has occurred, typically on the order of 0.01 sec., step motor 11 is commanded by signal ρ from system control 5 to operate. Step motor 11 operates as necessary to radially move m the workpiece 6 the equivalent of the width of the next line to be engraved, typically a space of 10 μm. The typical time required to move radially one step is <0.1 m sec. The workpiece 6 is then rotated through another complete revolution. This sequence of rotation followed by radial movement continues to completion of the image.

Figure 3:
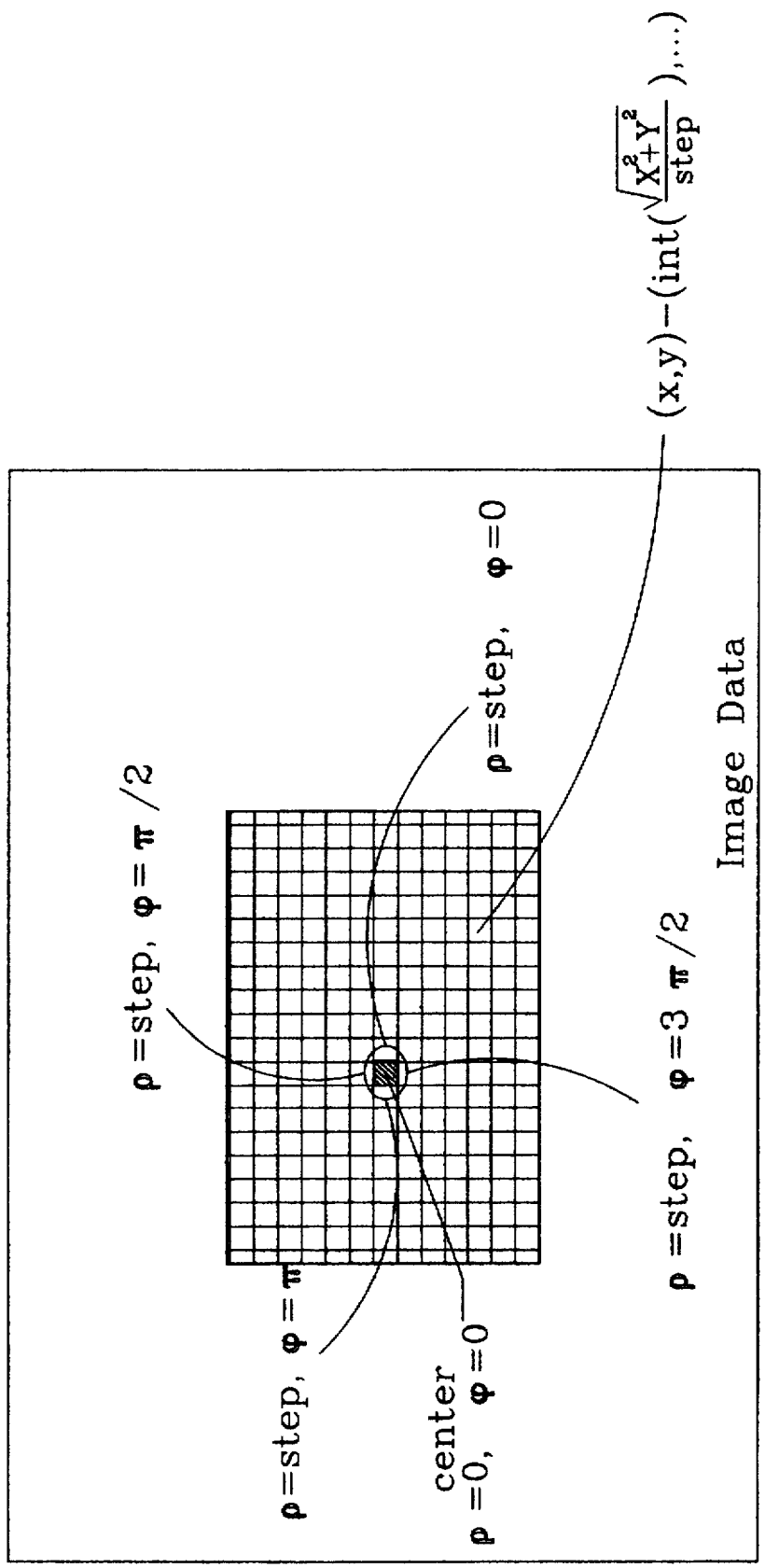
FIG. 3 is a diagram of the image data grid of the image to be engraved.

Reference is next made to FIG. 3 which is a diagram of the material data grid of the image which is scanned and stored in system control 5 for engraving. The center of the material is depicted by X-Y coordinates (O,O). The X-Y coordinates also correspond to polar coordinates ρ=O, φ=O. The location of each adjacent pixel which corresponds to the polar coordinate of the pixel in the material as it is rotated is stored in the system control 5. For example, the material when stepped through one rotation corresponds to φ=O, φ=π/2 (90°), φ=π(180°), φ=3/2π(270°). Upon completion of one rotation, the material point of engraving (not shown) is also radially stepped one step as depicted by ρ=step as measured from the origin, or ρ=o. In this way, the X-Y coordinates of any point on the material are converted to polar coordinates ρ, φ, as well as to a rotation angular velocity ω by the formula:

$$(X-Y) - (int((x^2+y^2)^{1/2}/step), \ldots)$$

By use of this information, system control 5 controls the location of the point of engraving 22 (not shown) by establishing the number of rotations and radial steps necessary to engrave the image beginning at the origin and progressing to the outermost extremity. A graphic depiction of the path of engraving is set forth in FIG. 8.

Figure 4:
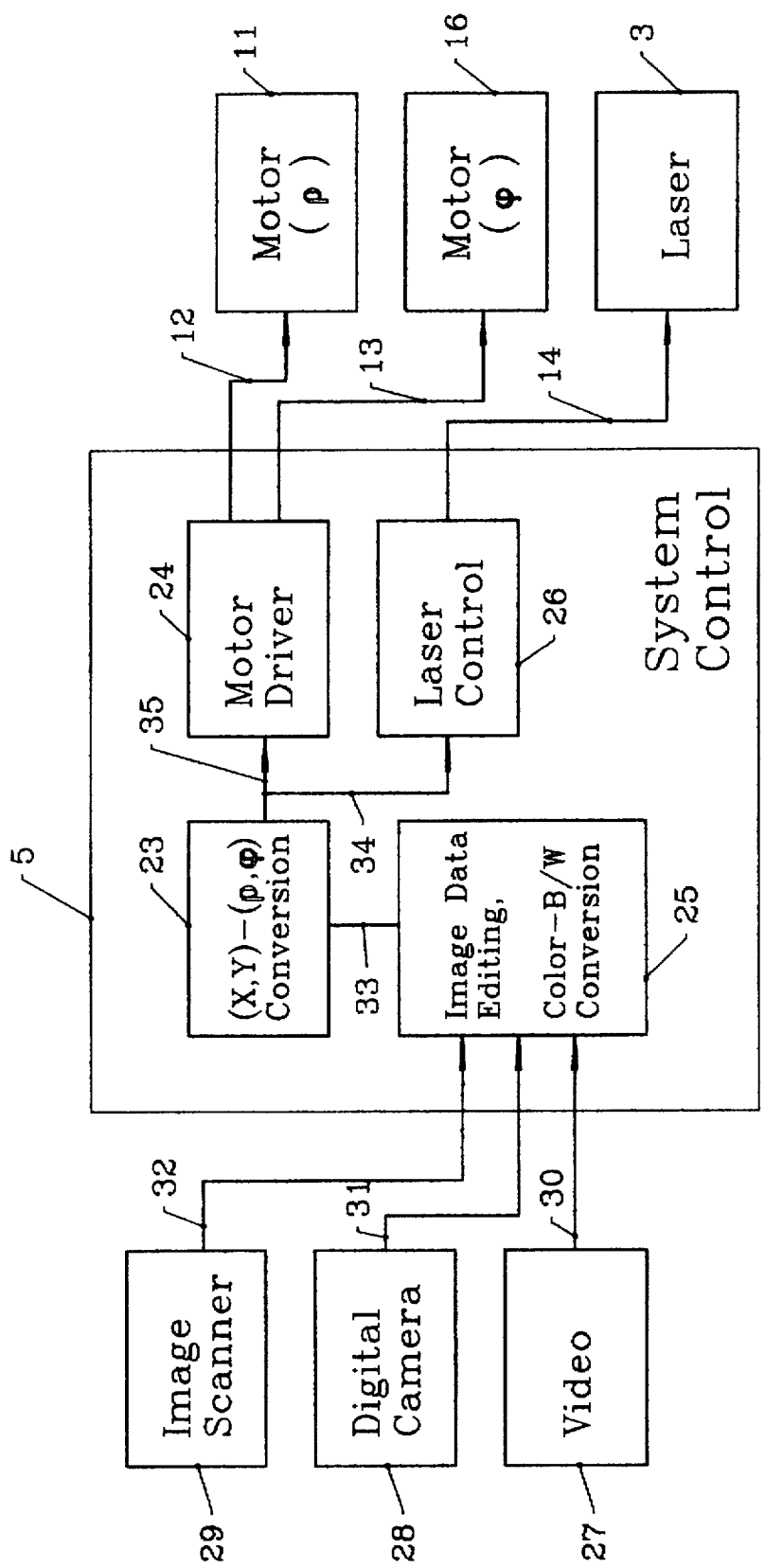
FIG. 4 is a schematic diagram of the system control logic.

Reference is next made to FIG. 4 which is a schematic diagram of the system control logic. The following description is not intended to limit the type of camera intended to perform the function described. Even though specific camera types are identified, it should be noted that the function attributed to a particular camera may be obtained from comparably functioning equipment. For example, the digital camera function may be performed by a video camera or an image scanner and vice versa. Image scanner 29 consists of a standard high-resolution camera and image capturing unit to capture the static image to be engraved on the material 6 (not shown). Video camera 27 surveys the material 6, rotary table 1, and the overall engraving progress. Signals from image scanner 29 are transmitted to the image data editor 25 by lead 32. Signals from digital camera 28 are transmitted to the image data editor 25 by lead 31. Signals from video camera 27 are transmitted to the image data editor 25 by lead 30. The image data editor 25 is connected to position converter 23 by lead 33. A signal transmitted from the image data editor 25 is processed by the position converter 23 to provide control signals to the motor driver 24 and laser control 26. Generation of the image scanner signal is described in FIG. 3. The image scanner signal describes the X-Y coordinates of the image on the workpiece (not shown) to be engraved. The position converter 23 converts the X-Y coordinate signals to polar coordinates ρ and φ respectively. Polar coordinates ρ and φ are transmitted by lead 35 to motor driver 24. Polar coordinates ρ and φ are also transmitted to laser control 26 by lead 34. Motor driver 24 processes the polar coordinates ρ and φ to produce control signals ρ and φ which are transmitted to step motor 11 and step motor 16 by leads 12 and 13 respectively. The control signals are a series of pulses which control the on/off operation and the position of step motor 11 and step motor 16. This, in turn, effects control of the top 15 (not shown) of the rotary table 1 (not shown) and of the linear stage 2 (not shown) which in turn controls the location of the material 6 (not shown) in relation to the laser beam 9 (not shown).

Figure 5:
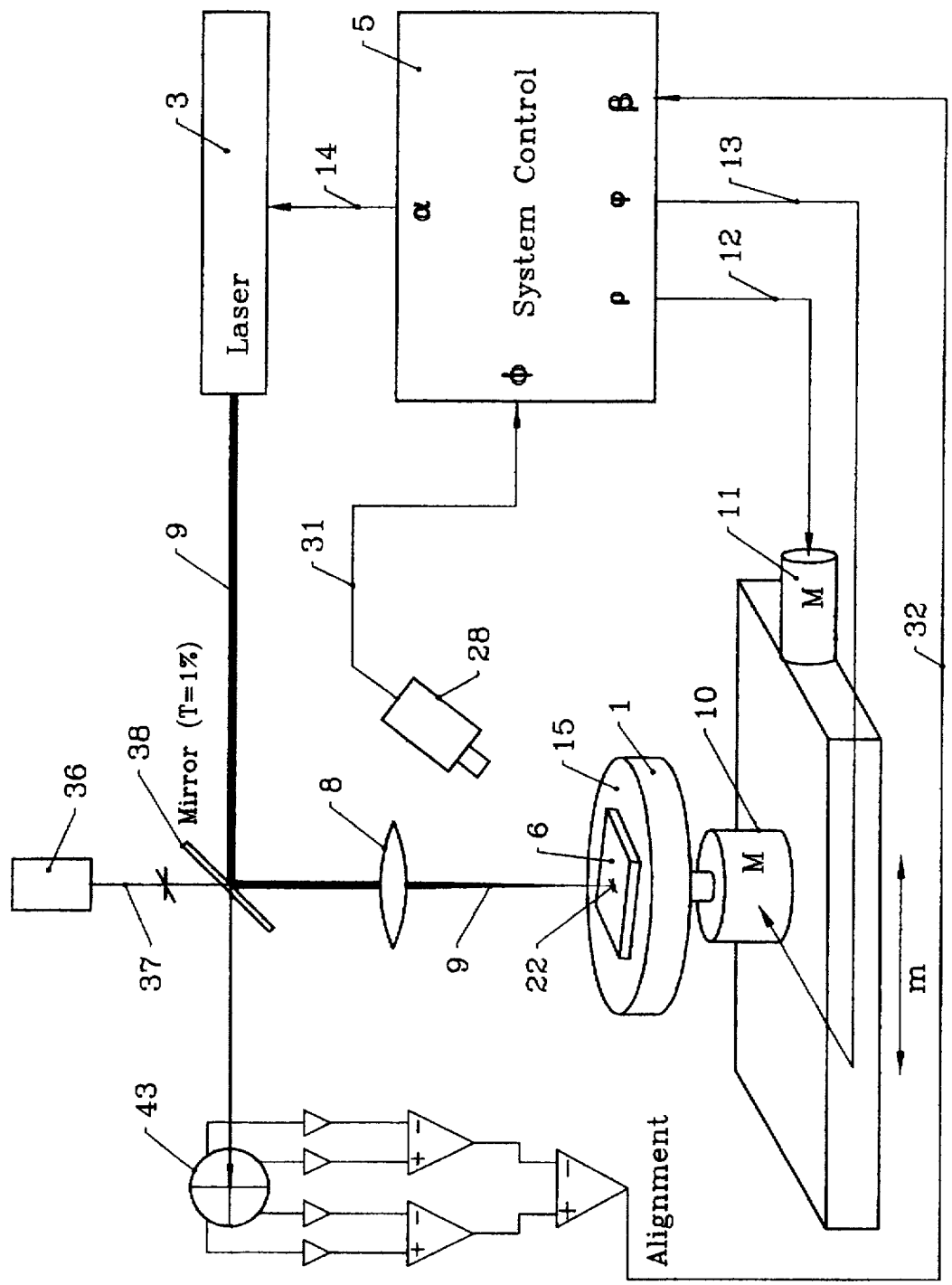
FIG. 5 is a schematic of the preferred embodiment having a video feedback loop.

Reference is next made to FIG. 5 which is a schematic of the preferred embodiment having an optional video feedback system. Video camera 28 transmits an image signal φ of the material 6 being engraved by lead 31 to system control 5. Cross-hair beam 37 is transmitted through partially (typically 1%) tinted mirror 38 through lens 8 to the material 6. Cross-hair beam 37 is also partially reflected from partially tinted mirror 38 to quadrant photo-detector 43. Quadrant photo-detector 43 (known in the art) detects the position of the laser beam 9 as superimposed on the cross-hair beam 37. Signal β from quadrant photo-detector 43 is transmitted by lead 32 to system control 5.

Quadrant photo-detector 43 and its detection of the location of the laser beam 9 in relation to the cross-hair beam 37 is used to accurately determine the point of engraving 22. Cross-hair beam 37 is focused at the point of engraving 22 on workpiece 6. Laser beam 9 is then centered in the cross-hair beam 37. This is accomplished by projecting cross-hair beam 37 on quadrant photo-detector 43. Laser beam 9 illuminates a part of the quadrant photo-detector 43. Depending on the location of laser beam 9 on quadrant photo-detector 43, signal β having a character corresponding to the location of the laser beam 9 is generated. Signal β is processed by system control 5 which then operates step motor 10 and step motor 11 as necessary to align laser beam 9 in the cross-hair beam 37 as projected in quadrant photo-detector 43. This results in proper alignment of the laser beam 9 on the point of engraving 22.

Figure 6:
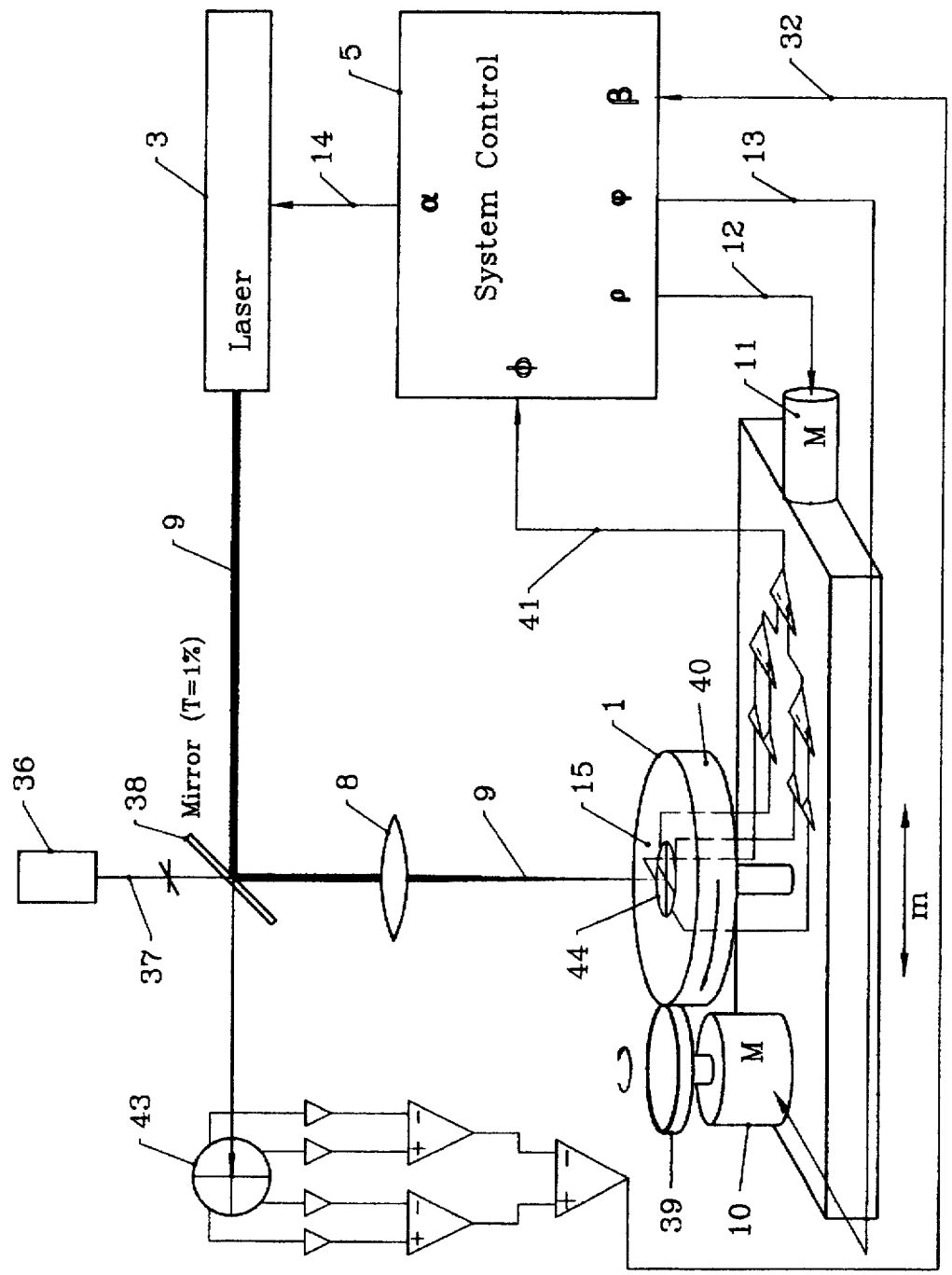
FIG. 6 is a schematic of the preferred embodiment showing the alignment logic.

Reference is next made to FIG. 6 which is a schematic of an alternate embodiment. Step motor 10 rotates rotary table 1 with the high-friction contact between capstan 39 and edge 40. In this embodiment, the quadrant photo-detector 44, used to align the laser beam 9 with the cross-hair beam 37, is directly mounted on the top 15 of rotary table 1. Signal γ is transmitted from quadrant photo-detector 44 by lead 41 to system control 5. For the automatic start position finding, quadrant photo-detector 44 senses the laser beam 9 position to send positioning data for the point of engraving 22 to the system control 5. Step motor 10 and step motor 11 are then operated by system control 5 to properly position the center of rotary table 1 in laser beam 9.

Figure 7:
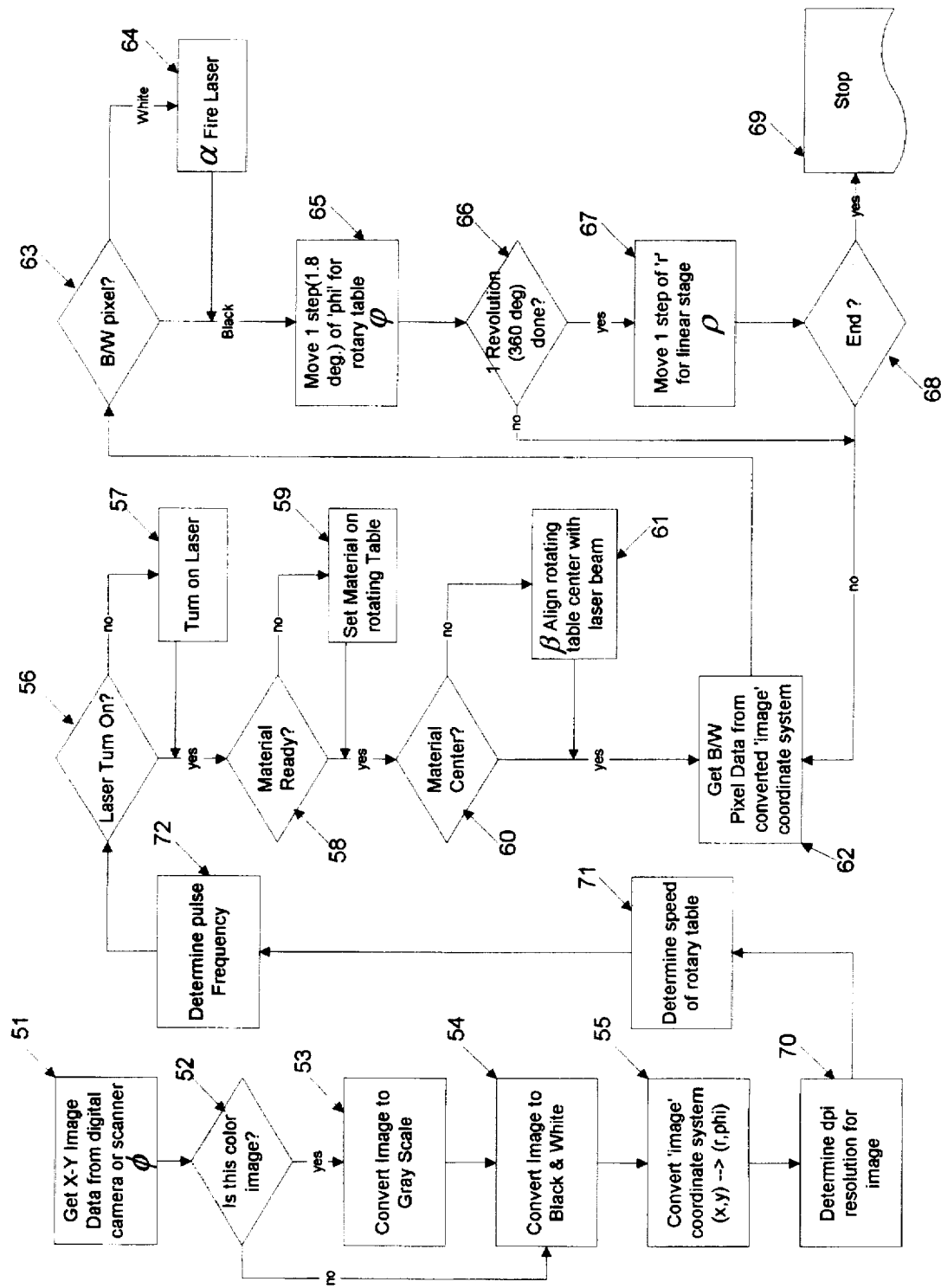
FIG. 7 is a block diagram of the control system.

Reference is next made to FIG. 7 which is a logic diagram describing the system. System control 5 (not shown) obtains the X-Y image data 51 from the image scanner as described in FIG. 3. This data is processed by system control 5 to determine if the image is in color 52 and if so it then converts the image to a gray scale 53. The data is then converted to black and white 54. Once the image to be engraved is converted to black and white, the signal or data is processed in order to convert the X-Y coordinates (X,Y) to polar coordinates, φ and ρ, respectively 55. The source code for the software to effect such conversions is contained in FIG. 13 (Appendix 1). Once the converted image is generated, the system control determines the proper dpi resolution for the image to be engraved 70. This is then used by the system control to determine the rotational speed of the rotary table 71. This in turn is used to determine the pulse frequency of the laser beam source 72. In anticipation of engraving, system control 5 determines if it is necessary to turn on the laser 56 and, if so, turns on the laser 57. This is not equivalent to firing the laser, which occurs in block 64. Once the laser is turned on, the material 58 is placed on the rotary table 59 by the user (not shown) and centered 60. If the material (not shown) is not properly aligned on the rotary table according to signal β from the quadrant photo-detector (not shown), the system control then signals the step motors to achieve proper alignment of the material. Once aligned, the system control retrieves the converted, black and white image data 62. Since the point of engraving (not shown) is now concentric with the center of the material (not shown) as a result of the alignment process, the system control then determines whether or not the point to be engraved is a black or white pixel. If it is a white pixel then the system control sends signal α which commands the laser to fire 64. If the pixel is black, then the laser does not fire and the rotary table (not shown) is commanded with signal φ to rotate one step 65. The system control then determines if one 360° revolution has been completed. If not, the system control identifies the next pixel from the pixel data 62. This in turn then results again in the laser firing 64 or not depending on whether the pixel is black or white. Upon completion of one revolution of the rotary table 66, the system control then commands the step motor (not shown) with signal ρ to operate thereby translating the linear stage one radial step. Having so moved, the system control then retrieves the next pixel 62. The foregoing process is repeated until the image is complete, at which time the end command 68 stops the process 69. The engraving steps are summed (Σ) in a counter according to the image scanner signal pursuant to the image description in FIG. 3. The value of step φ for the rotary table may be 1.8/n degree depending upon the degree of quality or resolution required. This assumes the step motor operates at 200 steps per revolution. By controlling the firing of the laser beam source, up to 1024 microsteps may be inserted into each step motor step. This is also the case with step ρ of the linear stage which is adjustable in accordance with the quality needs of the user.

Figure 8:
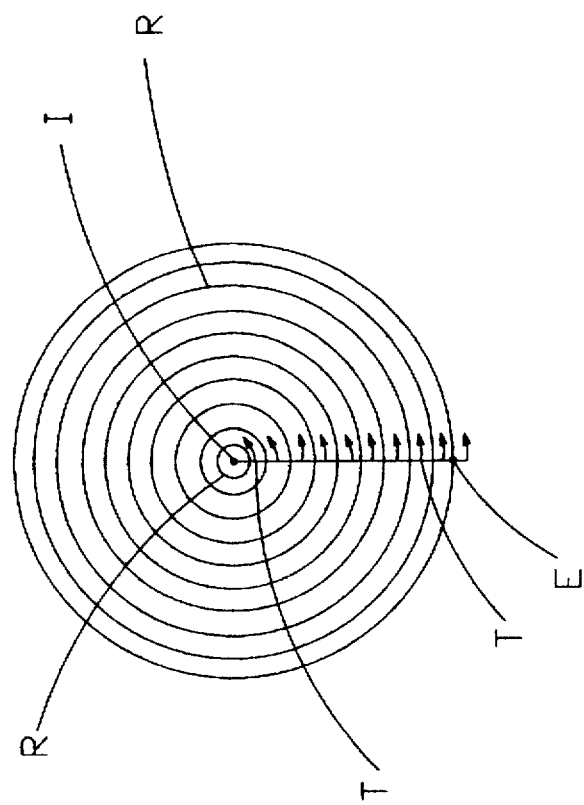
FIG. 8 is a graphic depiction of the path of the point of engraving.

Reference is next made to FIG. 8 which is a graphic depiction of the path of the point of engraving. The laser beam (not shown) begins engraving at the initial point I. It then proceeds according to the foregoing descriptions by translating radially outward one translation step T for each revolution R of the workpiece (not shown). The image engraving is complete when the point of engraving reaches end point E. The diagram of the point of engraving is generated by the conversion of the visual image as described in FIG. 3.

Figure 9:
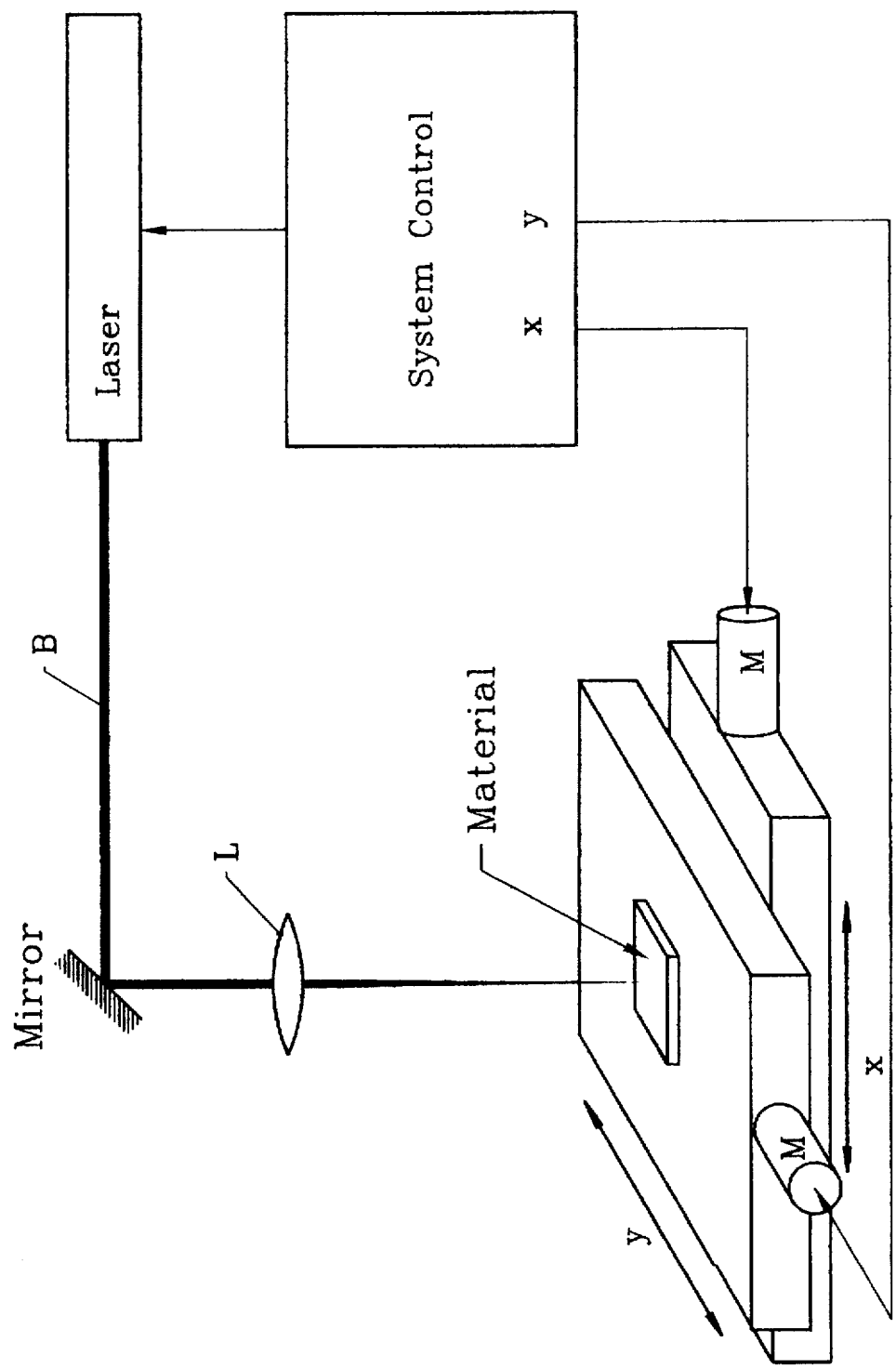
FIG. 9 is a schematic of the prior art.

Reference is next made to FIG. 9 which is a depiction of the prior art. Hithertofore there have been known various methods and apparatus which are basically based on the X-Y coordinate system for laser engraving.

One method and apparatus known in the prior art is X-Y table type as shown in FIG. 9 in which the laser beam is fixed and material on the X-Y table moves using X-Y coordinate system. As the material position is moved, the laser is turned off and on to engrave. Position control can be accomplished using a computer or similar position control device to achieve the required pattern of engraving. In this case, the maximum speed of engraving is restricted to the speed of travel of the table. Only relatively low speed can be achieved. However, high-quality engraving and high-positioning accuracy are usually obtained.

Figure 10:
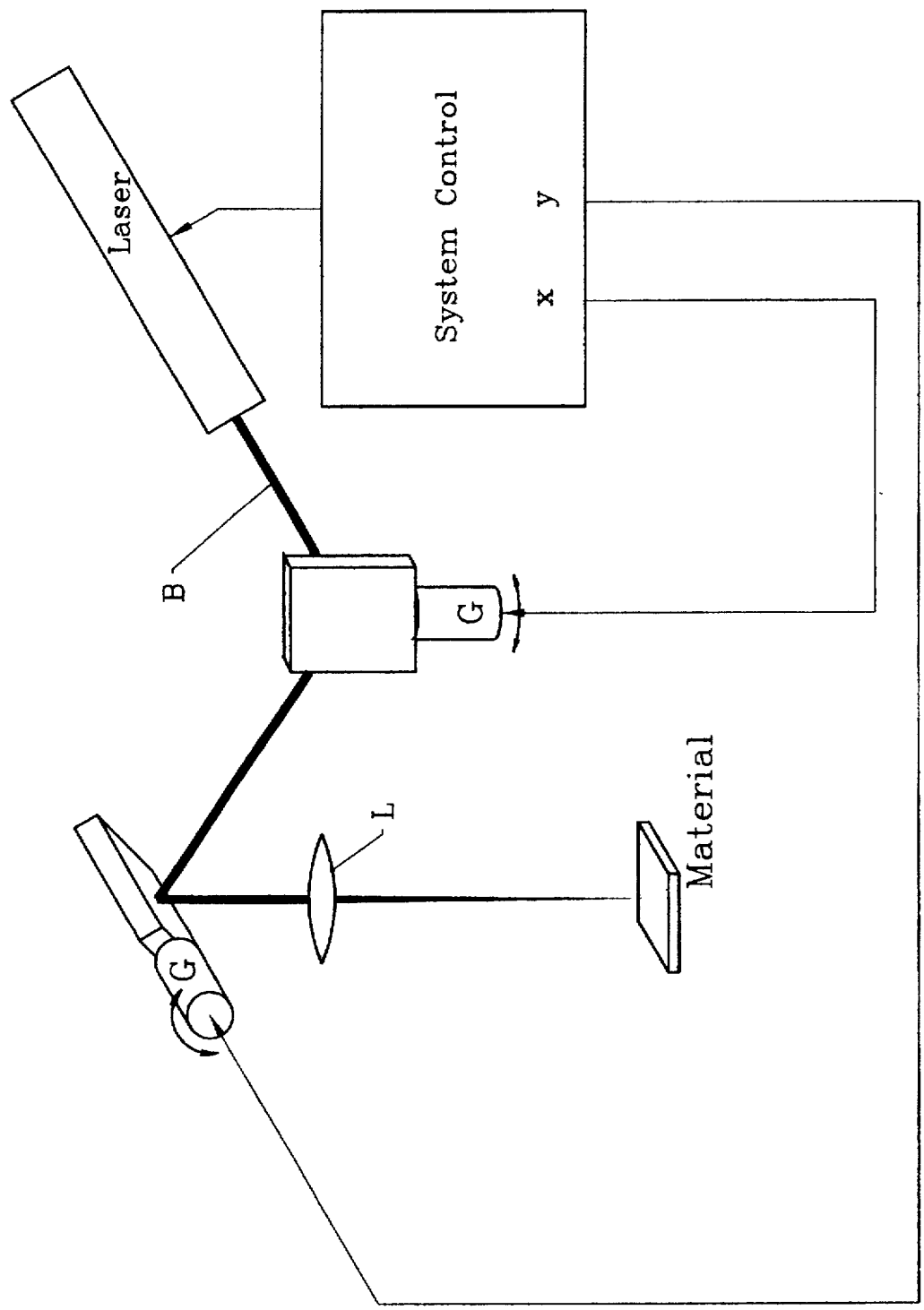
FIG. 10 is a schematic of the prior art.

Another known method and apparatus in the prior art is the moving mirror type as shown in FIG. 10 in which the laser beam is moving and material on the table is fixed. Galvanometer G or other similar device effects the mirror movement and consequently the laser movement across the material. Position control of the material can be accomplished using X-Y coordinate system. In this case, the maximum speed of engraving is restricted to the speed of the oscillating device (i.e., galvanometer). Relatively high speeds can be achieved. The positioning accuracy, in this configuration, is relatively crude. This configuration is good for so-called vector-marking in which characters and symbols are main candidates for engraving.

Figure 11:
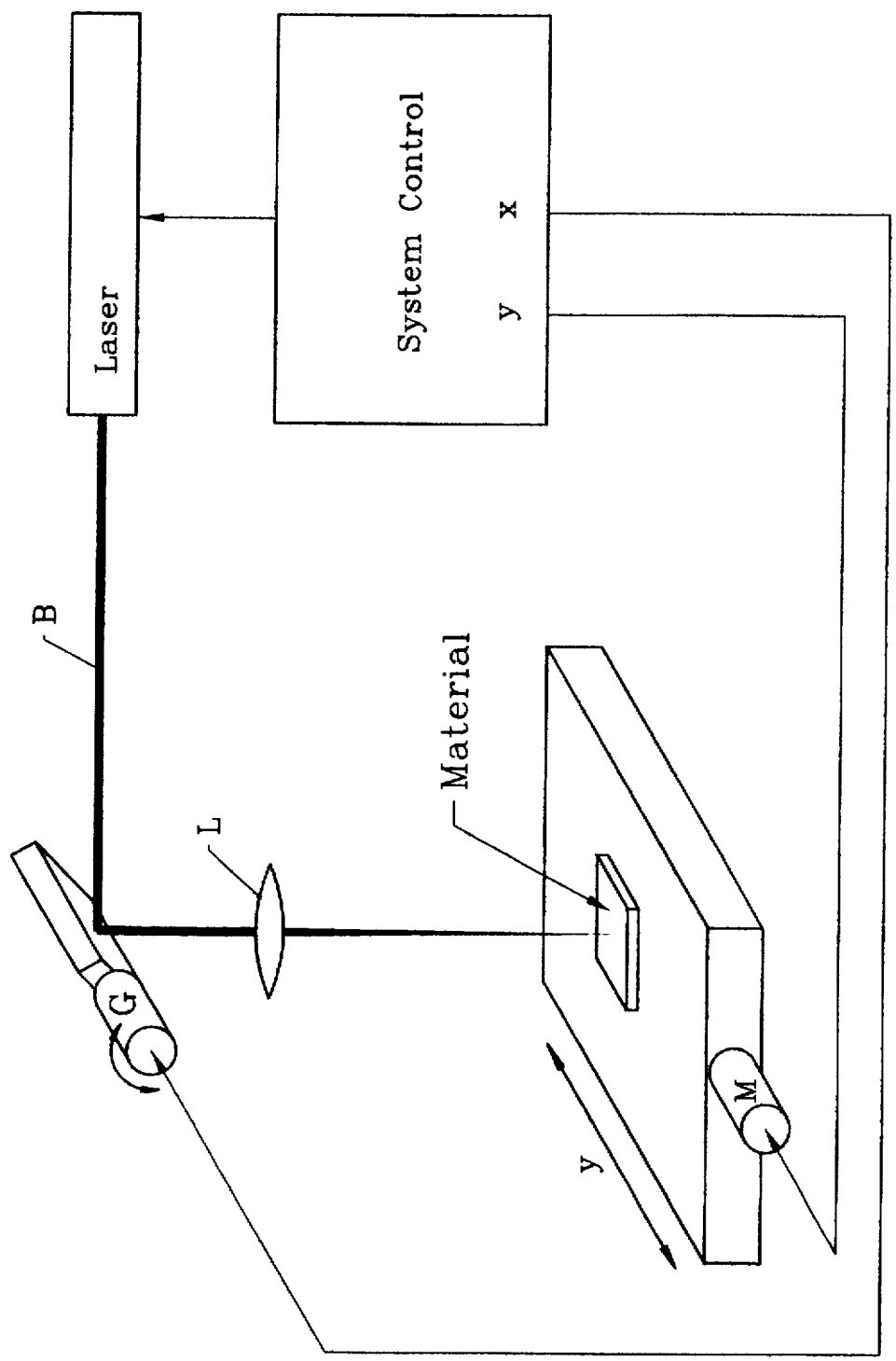
FIG. 11 is a schematic of the prior art.
Figure 12:
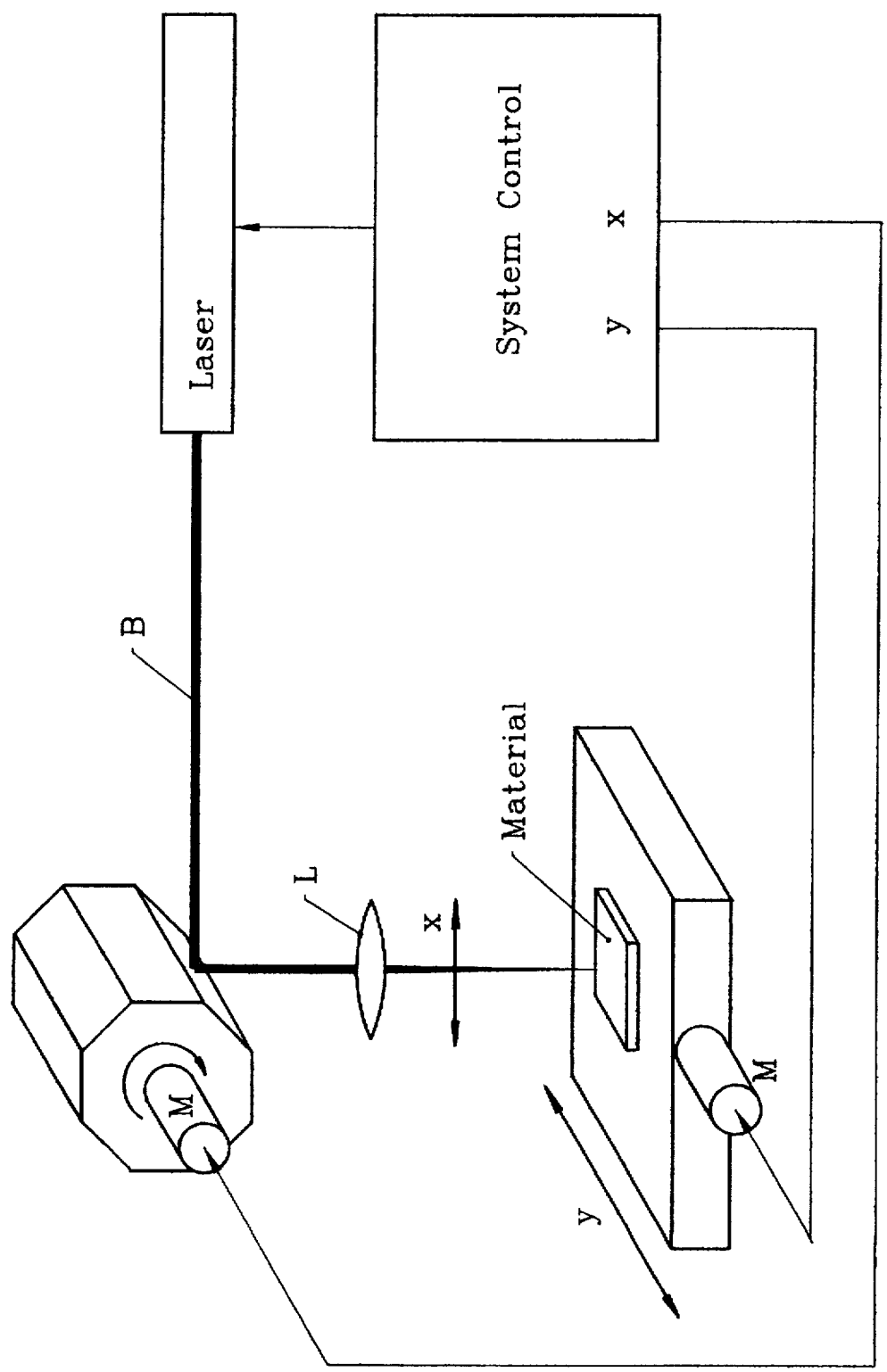
FIG. 12 is a schematic of the prior art.

Another configuration may be obtained using the combination of above mentioned prior art schemes as shown in FIG. 11 and FIG. 12. Those mixed configurations are basically the same in the sense that they employ an X-Y coordinate system for the movement of the material and/or laser beam.

Although the present invention has been described with reference to preferred embodiments, numerous modifications and variations can be made and still the result will come within the scope of the invention. No limitation with respect to the specific embodiments disclosed herein is intended or should be inferred.

| KEY | |
| --- | --- |
| 1. Rotary table | 26. Laser controller |
| 2. Linear stage | 27. Video camera |
| 3. Laser beam source | 28. Digital camera |
| 4. Focusing optics controller | 29. Image scanner |
| 5. System control | 30. Lead |
| 6. Workpiece | 31. Lead |
| 7. Mirror | 32. Lead |
| 8. Lens | 33. Lead |
| 9. Laser Beam | 34. Lead |
| 10. Step motor | 35. Lead |
| 11. Step motor | 36. Laser diode |
| 12. Lead | 37. Cross hair beam |
| 13. Lead | 38. Partially tinted mirror |
| 14. Lead | 39. Capstan |
| 15. Top, rotating table | 40. Edge |
| 16. Step motor | 41. Lead |
| 17. Capstan | 42. Image scanner |
| 18. Belt | 43. Quadrant photo-detector |
| 19. Lens | 44. Quadrant photo-detector |
| 20. Lens | |
| 21. Lens housing | |
| 22. Point of engraving | |
| 23. Position converter | |
| 24. Motor driver | |
| 25. Image data editor | |
| σ. Control signal, step motor | |
| ρ. Control signal, step motor | |
| α. Control signal, laser | |
| β. Signal, quadrant photo-detector | |
| ω. Angular velocity | |
| γ. Signal, quadrant photo-detector | |
| φ. Image signal | |
| E. End point | |
| G. Galvanometer | |
| I. Initial point | |

-continued

KEY r. Arc
R. Revolution
T. Translation step
X,Y. Rectilinear coordinates

We claim:

1. A laser engraver comprising:
    a laser having a controllable beam;
    a rotating workpiece table mounted on a translation stage which functions to controllably move said rotating workpiece table in a single axis normal to said beam;
    a controller which moves said translation stage a predetermined distance upon completion of a revolution of said rotating workpiece table in accordance with a location of a known point; and
    said controller further comprising a laser beam command to fire at a predetermined time corresponding to the known point on said rotating workpiece table, thereby forming an engraving on a workpiece similar to an image in the controller.

2. A method for cylindrical coordinate laser engraving comprising:
    converting a visual image to be engraved to a black and white pixel image;
    storing said black and white pixel image in a controller;
    placing a workpiece on a rotary table;
    rotating the table;
    controlling with said controller a laser beam source to fire normal to said workpiece at predetermined points derived from said black and white pixel image on said workpiece to engrave one circular line of said visual image;
    translating said rotary table radially a desired distance after each revolution of said material;
    engraving the next line of said visual image;
    continuing the rotating and translating until an engraving is of the visual image complete; and
    stopping the rotating.

3. The laser engraver as claimed in claim 1, wherein said rotating workpiece table further comprises a table connected to a controllable high-speed motor.

4. The laser engraver as claimed in claim 3, wherein said translation stage further comprises a table mechanically connected to a controllable high-speed motor.

5. The laser engraver as claimed in claim 4 further comprising focusing optics whereby said controllable beam is focused on the workpiece.

6. The laser engraver as claimed in claim 5 further comprising camera means functioning to record the image to be engraved by said controller.

7. The laser engraver as claimed in claim 1, wherein said controller further comprises a conversion means functioning to convert a set of X-Y coordinates the image to a set of cylindrical coordinates $\rho, \phi$.

8. The laser engraver as claimed in claim 7 further comprising a target means functioning to align said controllable beam with a predetermined point on a workpiece.

9. The laser engraver as claimed in claim 8 further comprising a camera means functioning to observe the progress of the engraving of a workpiece by a user.

10. The laser engraver as claimed in claim 7, wherein said conversion means functions to convert said recorded image to black and white pixels.

11. The cylindrical coordinate laser engraver as claimed in claim 8, wherein said target means further comprises a photo-detector means functioning to detect said controllable beam.

12. The cylindrical coordinate laser engraver as claimed in claim 11 further comprising a partially tinted mirror, whereby said target means is partially reflected so as to illuminate said photo-detector means simultaneously with said controllable beam and said controllable beam is positioned at a predetermined point on a workpiece.

13. The cylindrical coordinate laser engraver as claimed in claim 12, wherein said controller further comprises an adjustment means functioning to align said controllable beam in response to a signal received from said photo-detector.

14. The cylindrical coordinate laser engraver as claimed in claim 13 further comprising a photo-detector means mounted on said rotary table functioning to detect said controllable beam whereby said controllable beam may be aligned.

15. A laser engraver comprising:
    a laser having a controllable beam;
    a workpiece table mounted on a translation stage whereby said workpiece table is controllably moved in a single axis normal to said beam;
    a rotatable lens housing having a plurality of lenses functioning to controllably rotate said lenses whereby said controllable beam is controllably applied to a material on said workpiece table;
    a controller which moves said translation stage a predetermined distance upon completion of a revolution of said rotatable lens housing in accordance with the location of a known point; and
    said controller further comprising a laser beam command to fire at a predetermined time corresponding to a known point on a material on said workpiece table.

16. The cylindrical coordinate laser engraver as claimed in claim 15, wherein said translation stage further comprises a table mechanically connected to a controllable high-speed motor.

17. The cylindrical coordinate laser engraver as claimed in claim 16, wherein said rotatable lens housing further comprises a controllable high-speed motor.

18. The cylindrical coordinate laser engraver as claimed in claim 17 further comprising camera means functioning to record the image to be engraved by said controller.

19. The cylindrical coordinate laser engraver as claimed in claim 15, wherein said controller further comprises a conversion means functioning to convert a set of X-Y coordinates of a recorded image to be engraved to a set of cylindrical coordinates $\rho, \phi$.

20. The cylindrical coordinate laser engraver as claimed in claim 19 further comprising a camera means functioning to observe the progress of the engraving of a workpeice by a user.

21. The cylindrical coordinate laser engraver as claimed in claim 20, wherein said conversion means converts said recorded image to an array of black and white pixels.

22. The method for cylindrical coordinate laser engraving as claimed in claim 2 further comprising:
    converting said black and white pixel image from X-Y coordinates to cylindrical coordinates.

23. The method for cylindrical coordinate laser engraving as claimed in claim 22 further comprising:
    controlling the engraving of the workpiece with said cylindrical coordinates.

24. The method for cylindrical coordinate laser engraving as claimed in claim 23 further comprising:

controlling a rotational speed of said rotary table.

25. The method for cylindrical coordinate laser engraving as claimed in claim 24 further comprising:

connecting said rotary table to a controllable high-speed motor whereby said rotary table may be controllably translated.

26. The method for cylindrical coordinate laser engraving as claimed in claim 25 further comprising:

controllably focusing said laser beam source on said workpiece.

27. The method for cylindrical coordinate laser engraving as claimed in claim 26 further comprising:

automatically aligning said laser beam with said workpiece.

28. The method of cylindrical coordinate laser engraving as claimed in claim 27 further comprising:

observing the engraving process.

29. The method of cylindrical coordinate laser engraving as claimed in claim 28 further comprising:

using a photo-detector means functioning to detect said laser beam whereby said laser beam is aligned with said workpiece.

30. A method for cylindrical coordinate laser engraving comprising:

converting a visual image to be engraved to a black and white pixel image;

storing said black and white pixel image in a controller;

placing a workpiece to be engraved on a moveable table;

rotating a lens housing through which a laser beam source emits a laser beam;

controlling with said controller said laser beam source to fire normal to said workpiece at predetermined points derived from said black and white pixel image to engrave one circular line of said visual image;

translating said table a distance after each revolution of said lens housing;

engraving the next line of said visual image;

alternately rotating said lens housing and translating said table until an engraving of the visual image is complete; and stopping the rotation of said lens housing.

31. The method for cylindrical coordinate laser engraving as claimed in claim 30 further comprising:

converting said black and white pixel image from X-Y coordinates to cylindrical coordinates.

32. The method for cylindrical coordinate laser engraving as claimed in claim 31 further comprising:

controlling the engraving of the workpiece with said cylindrical coordinates.

33. The method for cylindrical coordinate laser engraving as claimed in claim 32 further comprising:

controlling the rotational speed of said lens housing.

34. The method for cylindrical coordinate laser engraving as claimed in claim 33 further comprising:

connecting said table to a controllable high-speed motor whereby said table may be controllably translated.

35. The method for cylindrical coordinate laser engraving as claimed in claim 34 further comprising:

controllably focusing said laser beam source on said workpiece.

36. The method for cylindrical coordinate laser engraving as claimed in claim 35 further comprising:

aligning said laser beam with said workpiece.

37. The method of cylindrical coordinate laser engraving as claimed in claim 36 further comprising:

observing electronically the engraving process.

38. The method of cylindrical coordinate laser engraving as claimed in claim 37 further comprising:

using a photo-detector means functioning to detect said laser beam whereby said laser beam is aligned with said material.

* * * * *